(12) United States Patent
Collison et al.

(10) Patent No.: US 8,209,929 B2
(45) Date of Patent: *Jul. 3, 2012

(54) INSULATING FLOOR UNDERLAYMENT

(76) Inventors: Alan B Collison, Pierce, NE (US); Chad A Collison, Pierce, NE (US)

( * ) Notice: Subject to any disclaimer, the term of this patent is extended or adjusted under 35 U.S.C. 154(b) by 1774 days.

This patent is subject to a terminal disclaimer.

(21) Appl. No.: 11/284,178

(22) Filed: Nov. 21, 2005

(65) Prior Publication Data

US 2006/0070326 A1  Apr. 6, 2006

Related U.S. Application Data

(60) Division of application No. 10/805,509, filed on Mar. 19, 2004, now Pat. No. 6,986,229, which is a division of application No. 10/038,187, filed on Jan. 4, 2002, now abandoned, which is a continuation-in-part of application No. 09/535,802, filed on Mar. 28, 2000, now Pat. No. 6,562,173.

(51) Int. Cl.
*E04F 15/22* (2006.01)
(52) U.S. Cl. ..................................... 52/403.1
(58) Field of Classification Search .......... 52/403.1, 52/408

See application file for complete search history.

(56) References Cited

U.S. PATENT DOCUMENTS

| | | | |
|---|---|---|---|
| 3,773,598 A | 11/1973 | Taeffner et al. | |
| 4,082,878 A | 4/1978 | Boe et al. | |
| 4,138,521 A | 2/1979 | Brown | |
| 4,172,170 A | 10/1979 | Foye | |
| 4,360,554 A | 11/1982 | Campbell et al. | |
| 4,504,537 A | 3/1985 | Mussallem, Jr. | |
| 4,505,964 A | 3/1985 | Dierichs et al. | |
| 4,647,484 A | 3/1987 | Higgins | |
| 4,719,723 A * | 1/1988 | Van Wagoner | 52/15 |
| 4,988,551 A | 1/1991 | Zegler | |
| 5,080,944 A | 1/1992 | Kauffman et al. | |
| 5,082,705 A | 1/1992 | Rose | |
| 5,103,614 A | 4/1992 | Kawaguchi et al. | |
| 5,501,895 A | 3/1996 | Finley et al. | |
| 5,507,906 A | 4/1996 | Woods et al. | |
| 5,514,722 A | 5/1996 | Di Geronimo | |
| 5,531,849 A | 7/1996 | Collins et al. | |
| 5,545,276 A | 8/1996 | Higgins | |
| 5,578,363 A | 11/1996 | Finley et al. | |
| 5,612,113 A | 3/1997 | Irwin, Sr. | |
| 5,716,472 A | 2/1998 | Rossetti | |
| 5,762,735 A | 6/1998 | Collins et al. | |
| 5,763,040 A | 6/1998 | Murphy et al. | |
| 5,846,461 A | 12/1998 | Collins et al. | |
| 5,968,630 A | 10/1999 | Foster | |
| 5,972,166 A | 10/1999 | Helwig et al. | |
| 6,305,920 B1 | 10/2001 | Kean et al. | |
| 6,383,623 B1 | 5/2002 | Erb, Jr. | |
| 2002/0025751 A1 | 2/2002 | Chen et al. | |

OTHER PUBLICATIONS

Quiet-Cor Underlayment (facsimile date of around Feb. 1999).

* cited by examiner

*Primary Examiner* — Branon Painter
(74) *Attorney, Agent, or Firm* — Harness, Dickey & Pierce, P.L.C.

(57) ABSTRACT

A flooring material having a textile pad substructure with a density of greater than 10 pounds per cubic foot is provided. The textile pad has reinforcement and binding fibers. The binding fibers are thermoplastic and are used to bind the reinforcement fibers together. The pad is created by heating and compressing a fibrous textile batt so that it has a density of greater than 13 pounds per cubic foot.

16 Claims, 3 Drawing Sheets

INSULATING FLOOR UNDERLAYMENT

CROSS-REFERENCE TO RELATED APPLICATIONS

This application is a divisional application of U.S. application Ser. No. 10/805,509 filed on Mar. 19, 2004, now U.S. Pat. No. 6,986,229, which is a divisional application of U.S. application Ser. No. 10/038,187 filed on Jan. 4, 2002, now abandoned, which is a continuation-in-part application of U.S. application Ser. No. 09/535,802 filed on Mar. 28, 2000, now U.S. Pat. No. 6,562,173. The disclosure of the above applications is incorporated herein by reference.

FIELD

The present invention relates generally to a textile pad for laminate floor underlayment. More specifically, the invention relates to a textile pad which is used under laminate or ceramic floors to improve acoustic and thermal insulation properties as well as crack resistance.

BACKGROUND

Textile pads are widely used in flooring applications. A pad is desirable when wood flooring is applied over a sub flooring. These pads used in flooring applications serve multiple purposes. They may absorb impact, such as from persons walking on the flooring. They may provide sound deadening, and may provide insulating properties against heat transfer. Pads also may accommodate roughness, unevenness, or other flaws in the sub flooring, and may provide a barrier against moisture and dirt. Finally, pads may lessen impact stresses on the flooring to lengthen the life of the flooring and make the flooring appear to be more durable and of a higher quality.

In the related art, textile pads are not used under ceramic flooring. This is because a pad would have to be relatively thin so as to not cause any unevenness in transition areas (i.e., areas of flooring type transition, such as in doorways, etc.). Furthermore, ceramic tiles traditionally must be placed on a solid floor substructure to prevent cracking of the tile or the adhesive or tile grout.

What is needed, therefore, are improvements in methods and apparatus for forming textile pads for a laminate floor underlayment as well as a textile pad which can be used under a ceramic tile floor.

SUMMARY

A flooring material having a textile pad substructure with a density of greater than 13 pounds per cubic foot is provided according to a first aspect of the invention. The insulative textile flooring pad has reinforcement fibers and binding fibers. The binding fibers are thermoplastic fibers which are melted to couple the binding fibers and reinforcement fibers together. The binding fibers are selected from the group of polyethylene, polyester, polypropylene, and mixtures thereof.

Further, a flooring structure is disclosed. The flooring structure has a sub floor, a surface layer, and an insulative pad disposed between the sub floor and the surface layer. The insulative pad has binder and reinforcement fibers distributed uniformly and randomly within a first plane. The binder fibers are meltable at a predetermined temperature to couple the binding fibers to the reinforcement fibers.

Further disclosed is a floor underlayment for disposal under a floor surface. The floor underlayment has less than 20% thermoplastic binder fibers and more than 80% reinforcement fibers. The floor underlayment has a first surface disposed adjacent to the floor surface and has a density of greater than 13.3 pounds per cubic foot.

Further disclosed is an apparatus for forming a plurality of textile pads from a textile batt according to another aspect of the invention. The apparatus comprises a pair of feed rollers for receiving a textile batt, a splitting knife downstream of the feed rollers that is capable of splitting the textile batt to produce partial thickness textile batts, adhesive appliers positioned downstream of the splitting knife that are capable of applying an adhesive to an outer surface of each of the partial thickness textile batts, vapor barrier supply positioned downstream of the adhesive appliers that is capable of supplying vapor barrier material that contacts the outer surfaces of the partial thickness textile batts, and pressure rollers positioned downstream of the vapor barrier supply that are capable of partially compressing the partial thickness textile batts to bond to the vapor barrier adhesive.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein.

DETAILED DESCRIPTION

The following description of the preferred embodiments is merely exemplary in nature and is in no way intended to limit the invention, its application, or uses.

Figure 1:
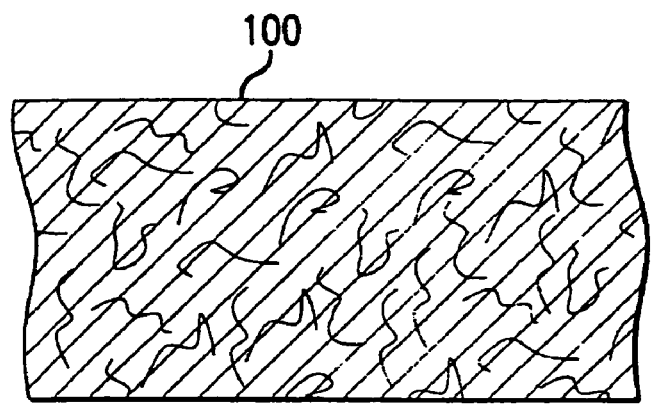
FIG. 1 shows a side or cross-sectional view of a portion of a textile batt.

FIG. 1 shows a side or cross-sectional view of an insulative floor batt 100, according to the teachings of the present invention. The insulative floor batt 100 is manufactured from any of a wide variety of textile compositions comprising, for example, polyester, nylon, acrylic, cotton, polypropylene, denim etc., or combinations thereof, including both natural and man-made fibers. Randomly distributed textile and binder fibers having lengths between $\frac{1}{16}$ inch to 1.5 inches and a denier of between 5 and 12 are used to form a textile batt 100, which is processed to form the insulative floor pad 90.

Figure 2:
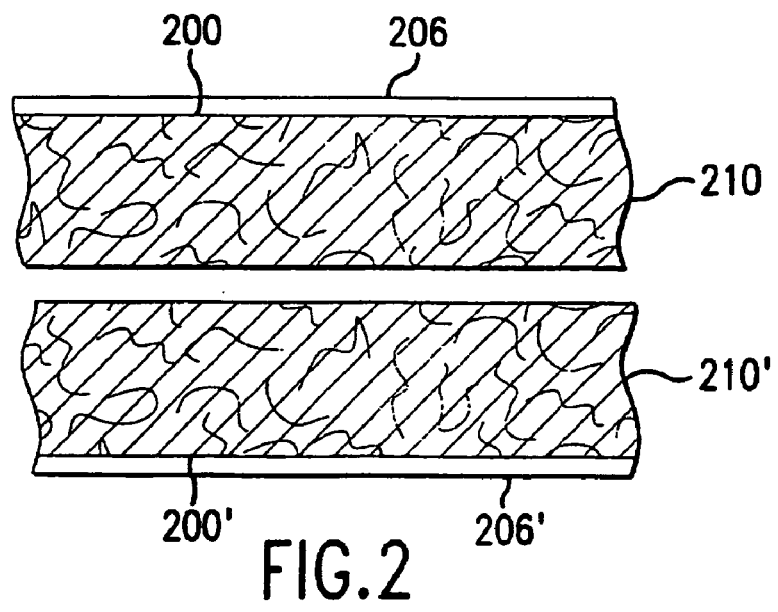
FIG. 2 shows two textile batts bonded to vapor barriers to form the two textile pads.

FIG. 2 shows one embodiment of the present invention where two textile pads 200' and 200 are bonded to vapor barrier layers 206' and 206 to form the two textile underlayment pads 210' and 210. The resulting pads may be used as a laminate flooring underlayment or as a pad for other types of flooring or for other purposes. The textile batt 100 is first heated in an oven 110 and compressed to form an insulative floor pad 90. Optionally, the insulative floor pad 90 can be split into two partial pads 200' and 200, and each pad bonded to a vapor barrier layer 206' and 206.

Each partial thickness pad 200' and 200 may be of equal thickness (i.e., the textile insulative floor pad is split in half), or may be of unequal thickness'. The present invention is capable of forming a partial thickness batt of about 1/16 of an inch or greater. The starting insulative floor pad 90 may be split longitudinally to provide two, three or more partial thickness batts.

The thermoplastic binder fibers and reinforcement fibers are laid randomly yet consistently in x-y-z axes. The reinforcement fibers are generally bound together by heating the binder fibers above their glass transition temperature. Typically, less than about 20% by weight binder fiber is used, and preferably about 15% binder fiber is used to form the insulative floor pad 90.

Thermoplastic binder fibers are provided having a weight of less than 0.2 pounds per square foot and, more particularly, preferably about 0.1875 pounds per square foot. The remaining reinforcement fiber is greater than 0.8 pounds per square foot, and preferably 1.0625 pounds per square foot The binder fibers are preferably a mixture of thermoplastic polymers which consist of polyethylene/polyester or polypropylene/polyester or combinations thereof.

The insulative floor pad 90 is formed by heating the textile batt 100 in the oven 110 to a temperature greater than about 350° F. and, more preferably, to a temperature of about 362° F. Such heating causes the binder fibers to melt and couple to the non-binder fibers, thus causing fibers to adhere to each other and solidify during cooling. Upon cooling, the binder fibers solidify and function to couple the non-binder reinforcement fibers together as well as function as reinforcement themselves.

The insulative textile batt 100 is compressed to form the insulative floor pad 90 so it has a density of greater than about 10 pounds per cubic foot. For underlayment floor systems, the insulative floor pad 90 preferably has a density of greater than about 10 pounds per cubic foot and, more preferably, about 13.3 pounds per cubic foot with a thickness of about 1/8 inch. For insulative floor pad 90 used under ceramic tile, the density is greater than about 15 pounds per cubic foot and, more preferably, about 18.9 pounds per cubic foot.

The sound insulating properties of the material as tested under ASTME90-97, ASTME413-87 provide that the insulative floor pad 90 preferably has a compression resistance at 25% of the original thickness of greater than about 20 psi and preferably about 23.2 psi, at 30% of greater than about 35.0 psi and preferably about 37.0 psi, and at 50% of greater than about 180 psi and preferably about 219 psi. The compression set at a compression of 25% of the original thickness is less than 20% and preferably about 18.8%, and the tensile strength is between about 60 and 80 pounds and, most preferably, about 78.4 pounds.

Figure 3:
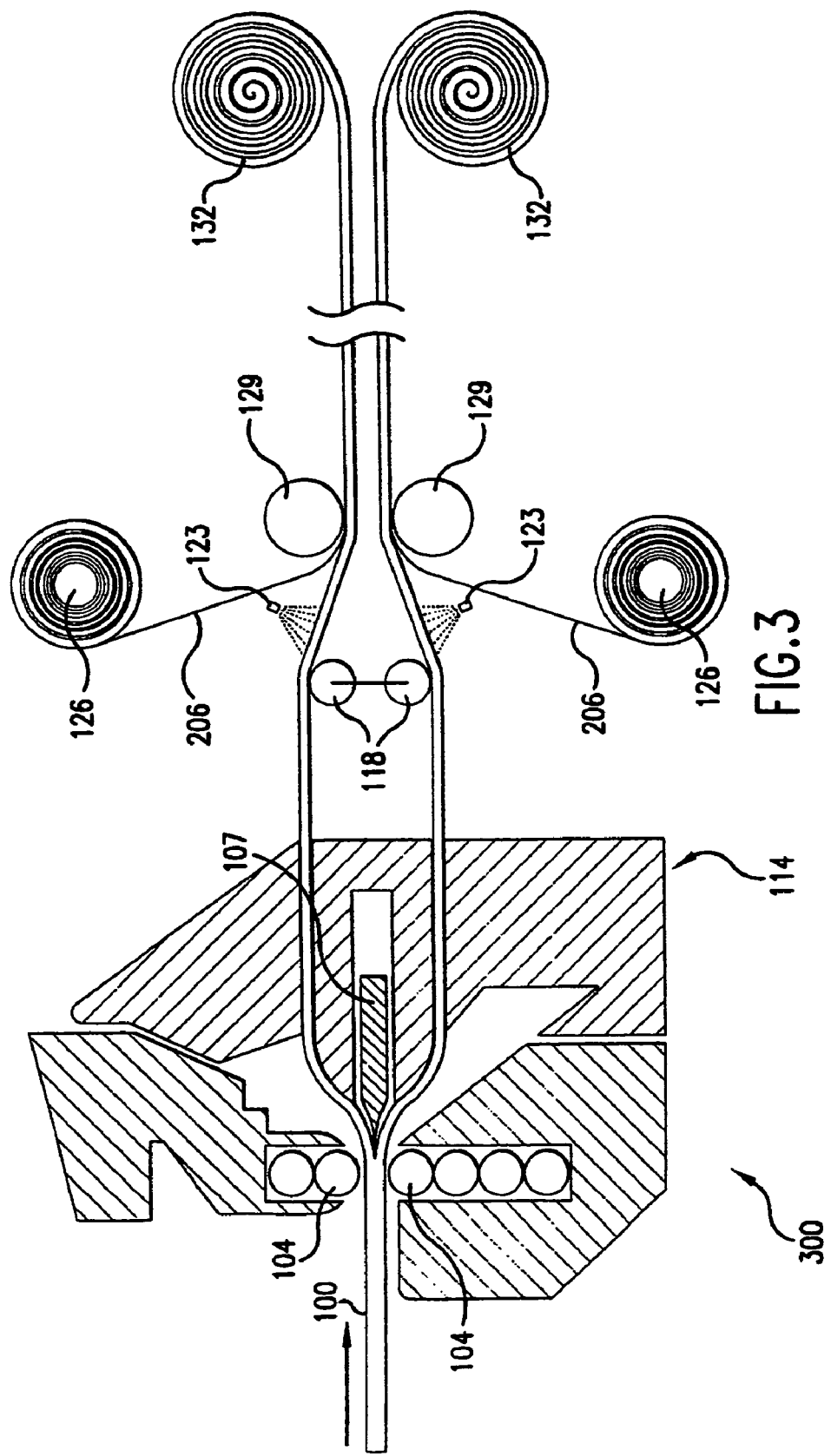
FIG. 3 shows an apparatus for forming two textile pads from the textile batt.

FIG. 3 shows an apparatus 300 for forming two textile underlayment pads 210 and 210' from the insulative floor pad 90. The apparatus includes a splitting machine 114, a pair of tension rollers 118, adhesive appliers 123, a pair of vapor barrier supply rollers 126 providing the vapor barrier layers 206, a pair of pressure rollers 129, and a pair of take-up rollers 132.

The feed rollers 104 receive the insulative floor pad 90 and pass it to the splitting knife 107, where the insulative floor pad 90 is split into the two partial thickness batts or pads 200' and 200. The thickness of each partial thickness pad is determined by both the thickness of the insulative floor pad 90 and the position of the splitting knife 107 in relation to the feed rollers 104. When the splitting knife 107 is substantially centered between the feed rollers 104, the insulative floor pad 90 will be split into two substantially equal partial thickness pads.

In the present invention, it has been found that the insulative floor pad 90 may be controllably and accurately split if the feed rollers 104 are positioned within a predetermined distance from the splitting knife 107. The distance is important because of the compressible and pliable nature of the insulative floor pad 90. In the preferred embodiment, the predetermined distance is from about zero to about two millimeters.

In a preferred embodiment using the Mercier Turner splitting machine 114, the splitting machine 114 is modified by adjusting the feed rollers 104 to a position as close as possible to the splitting knife 107, and removing feed guides so that the splitting knife 107 may be moved closer to the feed rollers than would be possible with the feed guides still in place. In addition, the splitting machine 114 is modified by changing the feed rollers 104 from a serrated surface type with multiple sections to a smooth surface type of a single piece construction.

The tension rollers 118 maintain a predetermined amount of tension on the two partial thickness pads 200' and 200.

The adhesive appliers 123 are downstream of the tension rollers 118 and apply adhesive to outer surfaces of the two partial thickness batts. In a preferred embodiment, the adhesive appliers 123 spray a layer of adhesive onto the two partial thickness batts. Alternatively, the adhesive appliers 123 may apply the adhesive directly such as, for example, with wipers or brushes.

The adhesive is preferably a high viscosity, low melting point adhesive that is applied hot and forms a bond as it cools (i.e., a "hot melt" adhesive). Such adhesives are available from H.B. Fuller, from Swift Adhesive, and from Western Adhesive (the Western Adhesive product is sold under the product name of RHM542.) Alternatively, any other adhesive capable of bonding the textile batt to the vapor barrier may be used.

The pair of vapor barrier supply rollers 126 are also located downstream of the tension rollers 118 and serve to supply a vapor barrier layer 206' and 206 to each of the two partial thickness pads 200' and 200.

The vapor barrier preferably is a plastic sheet material, typically about ½ to about 1 mil in thickness. The vapor barrier, as the name implies, prevents the travel of vapor (usually water vapor) through the textile pads 210' or 210. In the preferred embodiment, the vapor barrier layers 206' and 206 is coextruded polyethylene, but alternatively any flexible vapor barrier of a suitable thickness may be used.

The pair of pressure rollers 129 are downstream of the adhesive appliers 123 and the vapor supply rollers 126. The pair of pressure rollers 129 bring together the two partial thickness pads 200' and 200 and the two vapor barrier layers 206' and 206 to form the two textile underlayment pads 210' and 210. The pair of pressure rollers 129 heat and partially compress the batts during the bonding of the adhesive to form the two textile underlayment pads 210' and 210.

In the preferred embodiment, the pressure rollers 129 apply about 400 psi (pounds per square inch) of pressure to the two partial thickness textile pads 200' and 200 and to the vapor barrier layers 206' and 206. In addition, the pressure rollers 129 are maintained at a temperature of about 200 degrees Fahrenheit. The heating partially softens or breaks down the vapor barrier to make it pliable and to aid in penetration of the vapor barrier by the adhesive.

Downstream of the pressure rollers 129 is a pair of take-up rollers 132. The pair of take-up rollers 132 may be used to roll up the finished textile underlayment pads 210' and 210. The finished textile underlayment pads 210' and 210 may be used as a floor underlayment, a laminate floor underlayment, as part of a paint drop cloth, etc.

Figure 4:
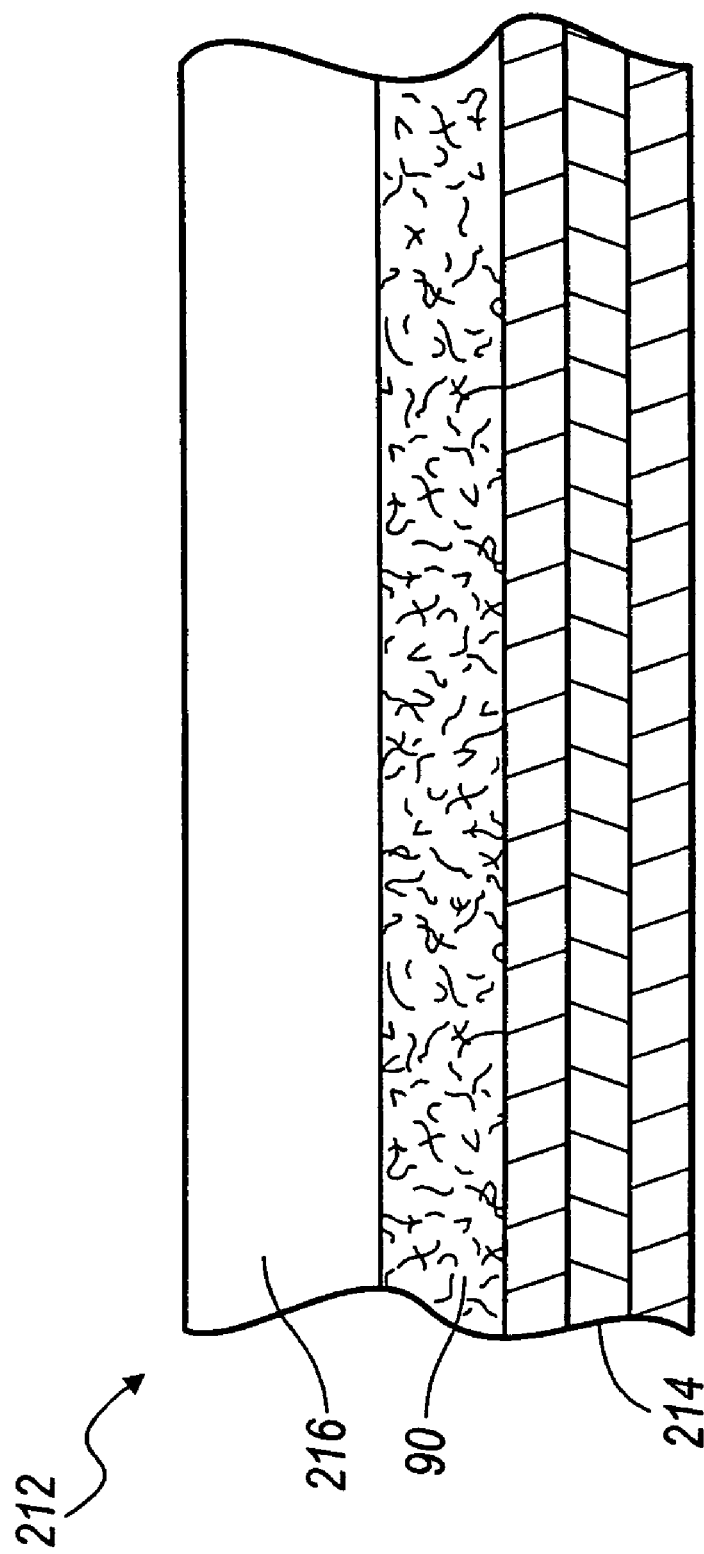
FIG. 4 shows a flooring structuring according to one embodiment of the invention.

FIG. 4 discloses a floor structure 212 according to the present invention. The floor is formed of a sub floor 214, a surface layer 216, and the insulative floor pad 90, which is disposed between said sub floor 214 and surface layer 216. The insulative floor pad 90 is formed by the binder and reinforcement fibers which are distributed substantially random in a first plane. The binder fibers are meltable at a predetermined temperature to couple the binding fibers to the reinforcement fibers.

The floor surface layer 216 can be wood, a wood based laminate, polymer, or ceramic. The binder fibers are thermoplastic and are preferably selected from the group containing polyethylene, polyester, polypropylene, and mixtures thereof. In situations where the floor surface layer 216 is ceramic, insulative floor pad 90 functions to reduce the effects of cracking or movement of the sub floor 214 on the surface layer 216. For example, should the cement sub floor 214 experience a horizontal separating crack, the insulative floor pad 90 functions to internally distribute strains within the floor structure 212. This reduces the amount of stress applied to the surface layer 216, thus reducing crack initiation in either the ceramic itself or its adhesive grout. Although the insulative floor pad 90 can have a dependent vapor barrier layer 206, it is preferred that a floor structure 212 having a ceramic surface layer 216 utilize an insulative floor pad 90 with no vapor barrier.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A floor structure consisting of:
   a sub floor;
   a wood based laminate;
   an insulative pad disposed between said sub floor and said wood based laminate, said insulative pad consisting of a fibrous web layer where one surface of said web layer is coated with an adhesive and wherein said web layer comprises binder and reinforcement fibers distributed substantially randomly in a first plane, said binder fibers being meltable at a predetermined temperature to couple the binder fibers to the reinforcement fibers; and
   a single polyethylene layer vapor barrier having a thickness of between about 0.5 to about 1.0 mil, fixably coupled to the insulative pad and in contact with the subfloor.

2. The floor structure according to claim 1 wherein the binder fibers are selected from the group consisting of polyethylene, polyester, polypropylene, and mixtures thereof.

3. The floor structure according to claim 1 wherein the insulative pad has a density of greater than about 10 pounds per cubic foot.

4. The floor structure according to claim 1 wherein the insulative pad has a density of about 18.9 pounds per cubic foot.

5. The floor structure according to claim 4 wherein the insulative pad is about 3/32 inch thick.

6. The floor structure according to claim 1 wherein the insulative pad has a compression resistance at a compression of 25% of the original thickness of greater than about 20 psi.

7. The floor structure according to claim 1 wherein the insulative pad has a compression resistance at 50% of the original thickness of greater than about 180 psi.

8. A floor structure consisting of:
   a sub floor;
   a wood based laminate;
   an insulative pad having a density of greater than 10 pounds per cubic foot disposed between said sub floor and said wood based laminate, said insulative pad consisting of a fibrous web layer where one surface of said web layer is coated with an adhesive and wherein said web layer comprises binder and reinforcement fibers distributed substantially randomly in a first plane, said binder fibers being meltable at a predetermined temperature to couple the binder fibers to the reinforcement fibers; and
   a single layer polyethylene vapor barrier having a thickness of between about 0.5 to about 1.0 mil, fixably coupled to the insulative pad, said polyethylene vapor barrier being in contact with the subfloor and disposed between the subfloor and the insulative pad.

9. The floor structure according to claim 8 wherein the binder fibers are selected from the group consisting of polyethylene, polyester, polypropylene, and mixtures thereof.

10. The floor structure according to claim 8 wherein the insulative pad has a density of greater than about 13.3 pounds per cubic foot.

11. The floor structure according to claim 8 wherein the insulative pad has a density of about 18.9 pounds per cubic foot.

12. The floor structure according to claim 11 wherein the insulative pad is about 3/32 inch thick.

13. The floor structure according to claim 8 wherein the insulative pad has a compression resistance at a compression of 25% of the original thickness of greater than about 20 psi.

14. The floor structure according to claim 8 wherein the insulative pad has a compression resistance at 50% of the original thickness of greater than about 180 psi.

15. A floor structure consisting of:
   a sub floor;
   a wood based laminate;
   an insulative pad having a density of greater than 10 pounds per cubic foot disposed between said sub floor and said wood based laminate, said insulative pad consisting of a fibrous web layer where one surface of said web layer is coated with an adhesive and wherein said web layer comprises binder and reinforcement fibers distributed substantially randomly, said reinforcement fibers being selected from the group consisting of nylon, acrylic, cotton, denim and mixtures thereof, said binder fibers being meltable at a predetermined temperature to couple the binder fibers to the reinforcement fibers, wherein the binder fibers are selected from the group consisting of polyethylene, polyester, polypropylene, and mixtures thereof; and
   a single layer polyethylene vapor barrier integrally coupled to the insulative pad disposed between the subfloor and the wood based laminate, said vapor barrier being between about 0.5 and about 1.0 mil in thickness.

16. The floor structure according to claim 15 wherein the vapor barrier is disposed adjacent the subfloor.

* * * * *